F. H. STICKNEY.
INTERNAL COMBUSTION ENGINE.
APPLICATION FILED MAY 28, 1913.

1,126,661.

Patented Jan. 26, 1915.
3 SHEETS—SHEET 1.

Witnesses
W. C. Fielding
Henry T. Bright

Inventor
F. H. Stickney,
By Chandler & Chandler
Attorneys

F. H. STICKNEY.
INTERNAL COMBUSTION ENGINE.
APPLICATION FILED MAY 28, 1913.
1,126,661.
Patented Jan. 26, 1915.
3 SHEETS—SHEET 2.
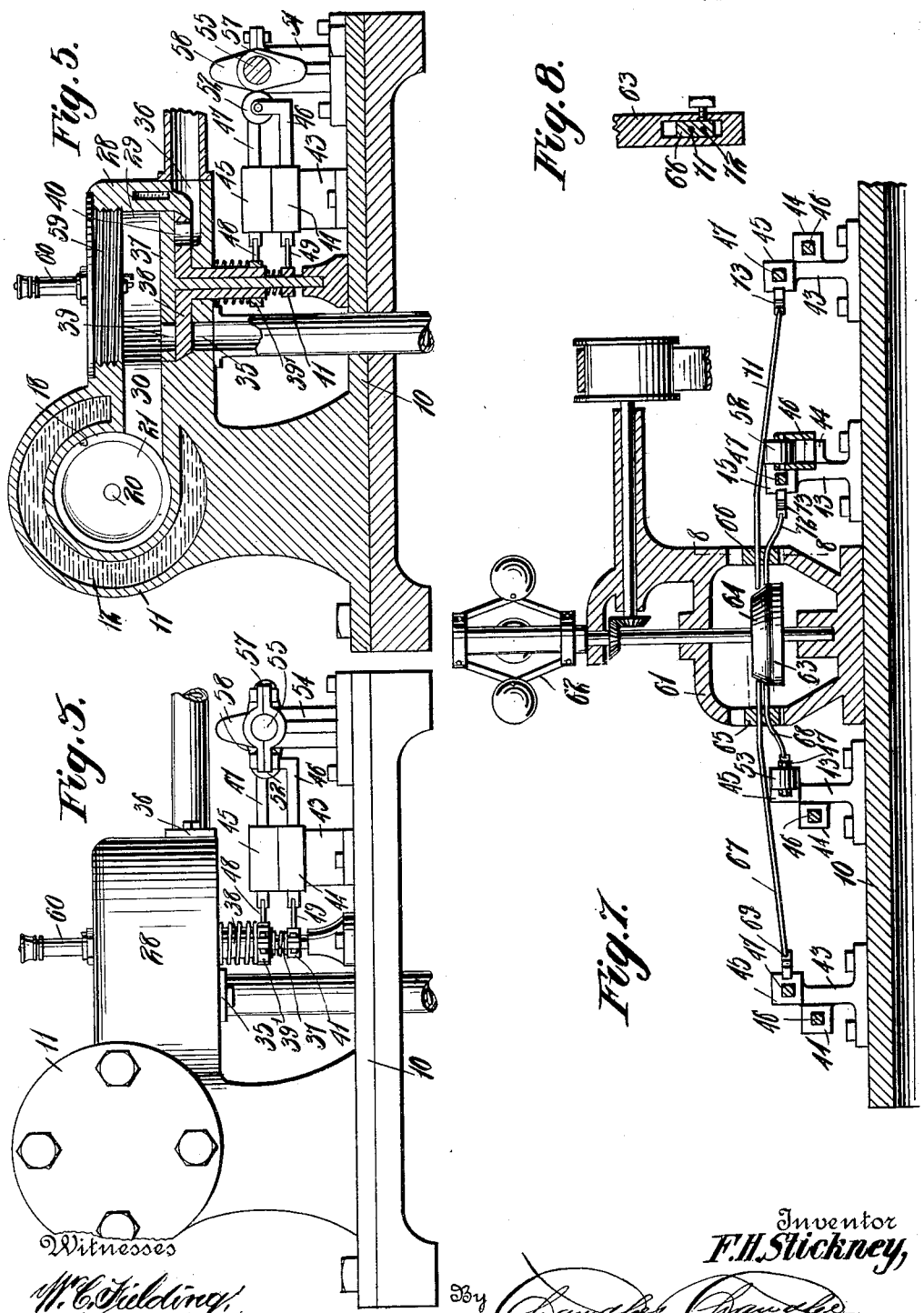
Witnesses
W. C. Fielding
Henry T. Bright
Inventor
F. H. Stickney,
By Chandler & Chandler
Attorneys

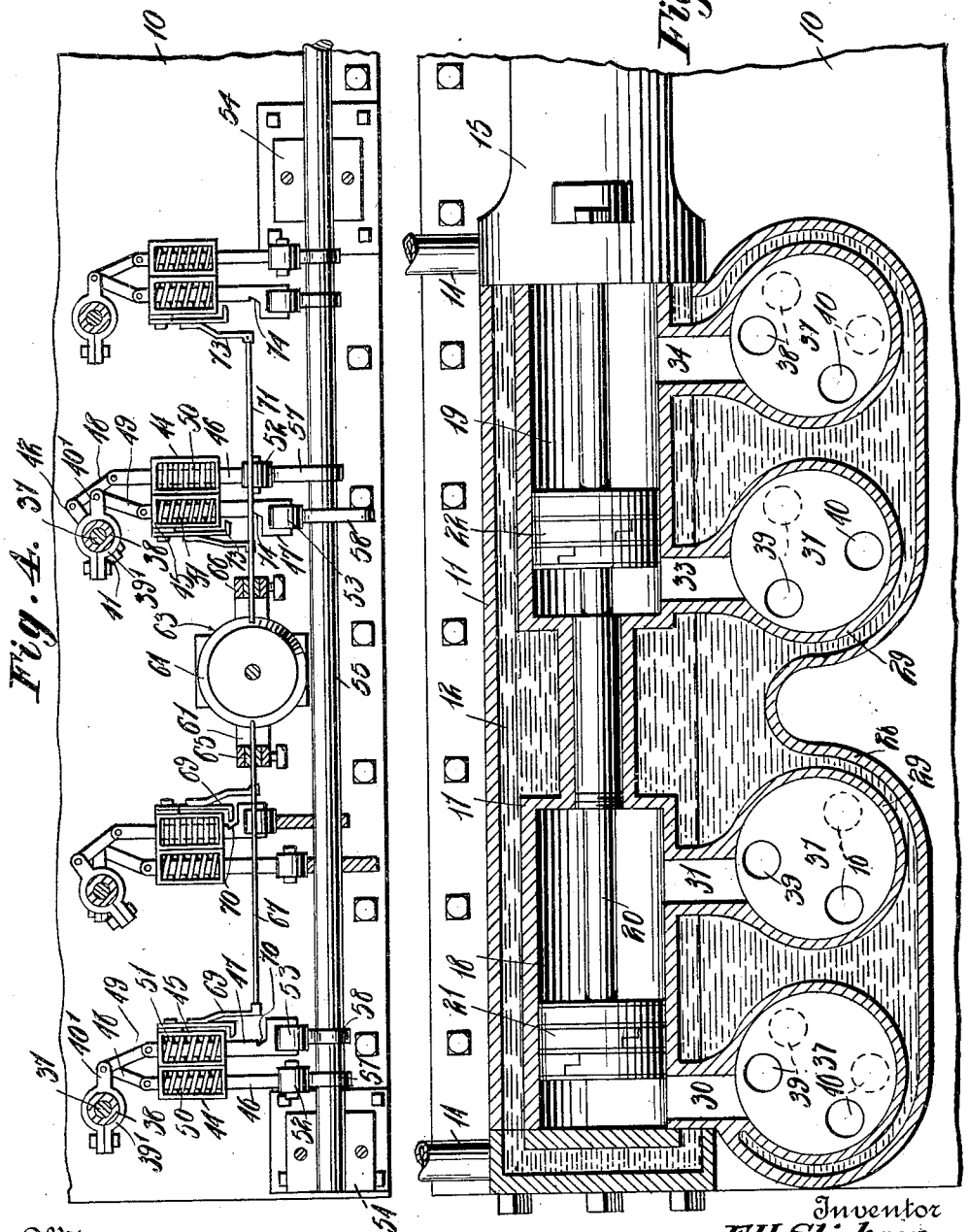

UNITED STATES PATENT OFFICE.

FRANCIS H. STICKNEY, OF MINNEAPOLIS, MINNESOTA, ASSIGNOR OF ONE-HALF TO H. W. LAZIER, OF MINNEAPOLIS, MINNESOTA.

INTERNAL-COMBUSTION ENGINE.

1,126,661.   Specification of Letters Patent.   Patented Jan. 26, 1915.

Application filed May 28, 1913. Serial No. 770,481.

*To all whom it may concern:*

Be it known that I, FRANCIS H. STICKNEY, a citizen of the United States, residing at Minneapolis, in the county of Hennepin, State of Minnesota, have invented certain new and useful Improvements in Internal-Combustion Engines; and I do hereby declare the following to be a full, clear, and exact description of the invention, such as will enable others skilled in the art to which it appertains to make and use the same.

This invention relates to internal combustion engines.

The object of the invention resides in the provision of an internal combustion engine of the horizontal type which embodies an improved construction whereby each stroke of the piston is rendered a power stroke.

A further object of the invention resides in the provision of an internal combustion engine which embodies an improved governing device whereby the various exhausts are automatically opened and the various inlets automatically closed when the engine begins to run above a predetermined speed, such action of the governing device serving to reduce the speed and thus maintain same within a given limit.

With the above and other objects in view the invention consists in the details of construction and in the arrangements and combination of parts to be hereinafter more fully described and particularly pointed out in the appended claims.

In describing the invention in detail reference will be had to the accompanying drawings wherein like characters of reference denote corresponding parts in the several views, and in which—

Figure 1:
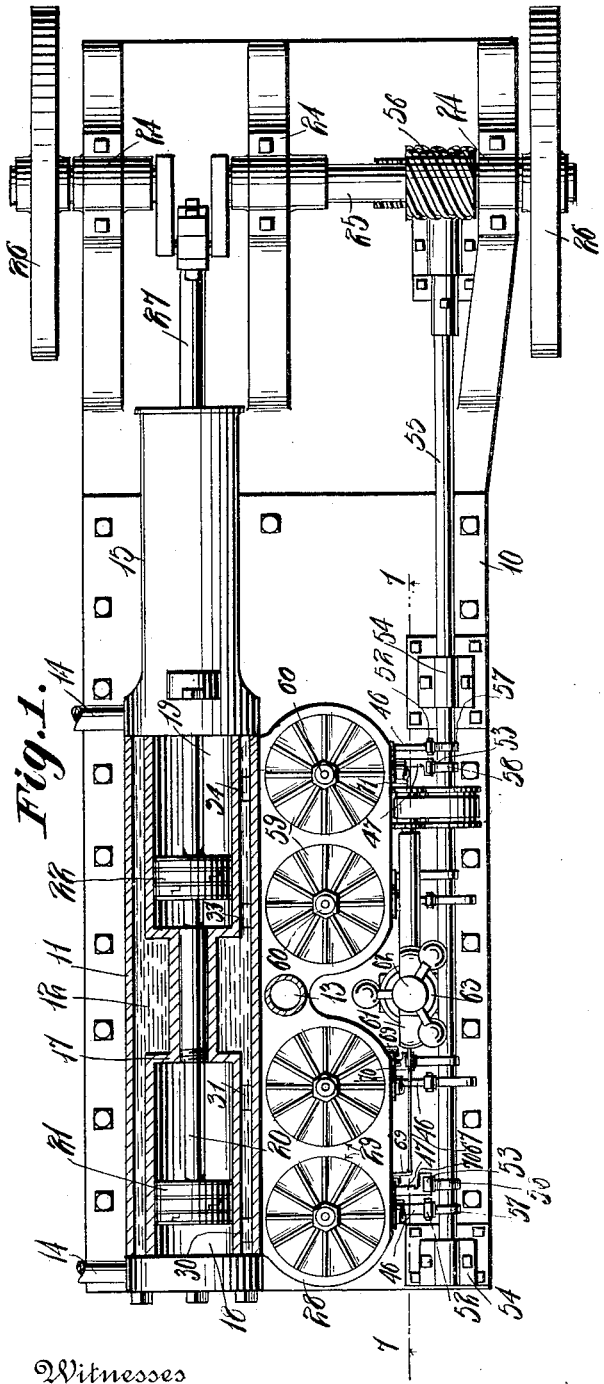
Figure 2:
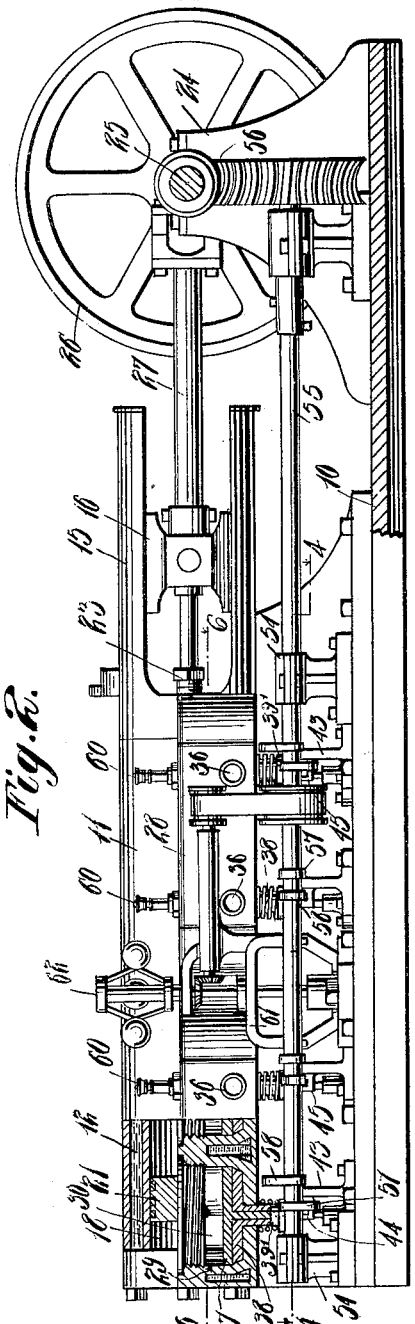

Figure 1 is a plan view partly in section of an internal combustion engine constructed in accordance with the invention; Fig. 2, a side elevation of same partly in section; Fig. 3, a rear end view of the engine; Fig. 4, a section on the line 4—4 of Fig. 2; Fig. 5, a vertical section through one of the heads of the valve chest; Fig. 6, a section on the line 6—6 of Fig. 2 with certain parts below the plane of the section omitted; Fig. 7, a section on the line 7—7 of Fig. 1, and Fig. 8, a section on the line 8—8 of Fig. 7.

Referring to the drawings the engine is shown as comprising a base 10 upon which is mounted a horizontal cylinder 11 including a water jacket 12. This water jacket is supplied through an intake 13 and discharges through outlets 14 in the usual and well known manner.

Secured to the forward end of the cylinder 11 is a cross head guide 15 in which is slidably mounted a cross head 16. The interior of the cylinder 11 is divided by a partition 17 into corresponding chambers 18 and 19.

Slidably mounted in the partition 17 is a piston rod 20 which has fixed on the inner end thereof and movable in the chamber 18 a piston head 21. Also fixed on the piston rod 20 and movable in the chamber 19 is a piston head 22 the forward end of the piston rod 20 slides in a stuffing box 23 mounted in the front end of the cylinder 10 and is connected to the cross head 16 in the usual and well known manner.

Mounted in journal bearings 24 forwardly of the cross head guide 15 is a crank shaft 25 which has fixed thereon fly wheels 26. The crank shaft 25 is connected to the cross head 16 by a rod 27 so that upon the reciprocation of the piston rod 20 the crank shaft 25 will be rotated.

Formed integral with the cylinder 11 is a valve chest 28 which is provided with four similar valve chambers 29. The two rearmost valve chambers 29 communicate with the front and rear of the chamber 18 of the cylinder through passages 30 and 31 respectively, while the two foremost valve chambers 29 communicate with the front and rear of the chamber 19 through passages 33 and 34 respectively.

Opening into each of the valve chambers 29 through the wall of the valve chest is an exhaust port 35 and an inlet port 36. These ports 35 and 36 are controlled by superimposed rotary valves 37 and 38 which are seated in each chamber 29 and are each provided with an exhaust opening 39 and an inlet opening 40. The stem of the valve 38 extends through the lower wall of the valve chest and is tubular in form, while the stem valve 37 extends through the bore of the stem of the valve 38.

Fixed on the stem of each valve 38 is a collar 39' provided with an arm 40', while a collar 41 is fixed on the stem of each valve 37 and provided with an arm 42.

Mounted on brackets 43 carried by the base 10 adjacent each valve chamber of the valve chest are guide members 44 and 45 in which are slidably mounted tappets 46 and 47 respectively. The inner end of the tappet 46 is connected to the arm 42 by a link 48, while the inner end of the tappet 47 is connected to the arm 40' by a link 49.

By this construction it will be apparent that as a sliding movement is imparted to the tappets 46 and 47 the valves 37 and 38 will be rotated. The tappets 46 and 47 are normally held in position to dispose the valves 37 and 38 so as to close the ports 35 and 36 by springs 50 and 51 respectively which are mounted in respective guide members 44 and 45 and encircle respective tappets. The tappets 46 and 47 have journaled in their outer ends rollers 52 and 53 respectively for a purpose that will presently appear.

Mounted in the base 10 in brackets 54 is a longitudinally disposed cam shaft 55 which is connected to the crank shaft 25 by a train of reducing gears indicated typically at 56. Fixed on this shaft 55 are cams 57 and 58 arranged in line respectively with the various tappets 46 and 47. During the operation of the engine the cams 57 and 58 are adapted to engage respective rollers 52 and 53 and slide tappets 46 and 47 against the influence of the springs 50 and 51 whereby the valves 37 and 38 are operated to close and open communication between the exhaust and inlet ports 35 and 36 and the valve chamber 29 with which said ports communicate. Each valve chamber 29 is closed by a cap 59 in which is mounted a spark plug 60 for exploding the charge in the well known manner. The cams 57 and 58 are so timed that a charge will be fired on one side or the other of the pistons 21 and 22 at the termination of each stroke of the engine so that a power stroke will be instituted at each dead center of the crank shaft.

The mechanism for controlling the speed of the engine comprises a bracket 61 mounted on the base 10 at the center of the cylinder 11. Rotatable on this bracket 61 is a governor 62 which is operated through connections with the cam shaft 55. This governor 62 includes a disk 63 having a tapered upper end 64 said disk being adapted to be moved upwardly when an excessive speed is imparted to the governor 62 through the medium of the rotation of the cam shaft 55.

Adjustably mounted in the bracket 61 are blocks 65 and 66.

Slidably mounted in the block 65 are the inner ends of rods 67 and 68 and the inner ends of said rods are adapted to coöperate with the tapered end 64 of the disk 63 as the said disk is moved upwardly by the governor 62. The outer ends of the rods 67 and 68 are connected to spring latches 69 respectively which are adapted to engage in notches 70 in respective tappets 47.

Slidably mounted in the block 66 are the inner ends of rods 71 and 72 respectively, whose inner ends are also adapted to coöperate with the tapered upper end 64 of the disk 63 in a manner similar to the rods 67 and 68. The outer ends of the rods 71 and 72 are also connected respectively to spring latches 73 adapted to engage in notches 74 formed on respective tappets 47.

By this construction it will be apparent that as the disk 63 is elevated the rods 67, 68, 71 and 72 will be forced outwardly so that when the tappets 47 are moved inwardly the latches 69 and 73 will engage respectively in notches 70 and 74 of the tappets 47 and lock said tappets against movement under the influence of the spring 51. When the tappets 47 are locked in this position communication between the valve chamber 29 and exhaust port 35 is open while communication between the valve chamber 29 and the inlet port 36 is closed. With this status established it will be apparent that the speed of the engine will immediately decrease and that the disk 63 will move downwardly. As soon as this downward movement of the disk 63 takes place the latches 69 and 73 will be automatically disengaged from respective notches 70 and 74 and the parts will resume their normal operation.

What I claim is:—

1. The combination with the cylinder and piston, of a valve chamber connected with the cylinder and provided with a valve seat and with fuel and exhaust ports opening through the bottom of said seat, superimposed valves rotatably mounted in the chamber and connected in said seat, each of said valves being provided with inlet and exhaust ports adapted to be brought into registration alternately with the fuel and exhaust ports of the valve chamber by rotation of the valve, and means for alternately rotating said valves to effect such registration.

2. In an internal combustion engine, a cylinder, a piston slidably mounted in said cylinder, a valve chest communicating with the cylinder and having inlet and outlet ports, superimposed rotary valves mounted in said valve chest for controlling the inlet and outlet port, slidable members mounted adjacent the cylinder, connections between said members and the stems of respective valves, whereby the sliding of one member will open communication between the valve chest and the exhaust port and the sliding of the other member will open communication between the valve chest and the inlet port, spring means constantly tending to hold said sliding members in a given position, a cam shaft, and cams mounted on said shaft adapted to coact respectively with the sliding members to successively place the valve chest in communicating with the exhaust and inlet ports.

In testimony whereof, I affix my signature, in the presence of two witnesses.

FRANCIS H. STICKNEY.

Witnesses:
 DORANCE D. GREER,
 ALICE G. BLAKELY.